(12) United States Patent
Kim et al.

(10) Patent No.: US 11,343,681 B1
(45) Date of Patent: May 24, 2022

(54) DYNAMIC BEAM MANAGEMENT OF AN ANTENNA ARRAY WITH A FAULTY ELEMENT

(71) Applicant: T-MOBILE INNOVATIONS LLC, Overland Park, KS (US)

(72) Inventors: Yun Sung Kim, Ashburn, VA (US); Jason Sigg, Overland Park, KS (US); Sanghoon Sung, Ashburn, VA (US); Pinal Tailor, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/505,246

(22) Filed: Jul. 8, 2019

(51) Int. Cl.
*H04W 16/28* (2009.01)
*H04B 7/06* (2006.01)
*H04W 84/04* (2009.01)

(52) U.S. Cl.
CPC .......... *H04W 16/28* (2013.01); *H04B 7/0617* (2013.01); *H04W 84/042* (2013.01)

(58) Field of Classification Search
CPC ... H04W 16/28; H04W 84/042; H04B 7/0617
See application file for complete search history.

(56) References Cited

U.S. PATENT DOCUMENTS

| | | | | |
|---|---|---|---|---|
| 6,140,976 A * | 10/2000 | Locke | ..................... | H01Q 3/267 342/173 |
| 2003/0114195 A1 * | 6/2003 | Chitrapu | .............. | H01Q 3/2605 455/562.1 |
| 2005/0122264 A1 * | 6/2005 | Coromina | ................. | H01Q 3/40 342/372 |
| 2011/0087306 A1 * | 4/2011 | Goossen | .............. | A61N 1/3718 607/60 |
| 2012/0169540 A1 * | 7/2012 | Jones | ...................... | H01Q 3/267 342/372 |
| 2013/0300602 A1 * | 11/2013 | Zhou | ..................... | H01Q 21/005 342/372 |
| 2014/0329485 A1 * | 11/2014 | Calin | ..................... | H04B 7/024 455/296 |
| 2015/0318610 A1 * | 11/2015 | Lee | ...................... | H01Q 1/1257 375/267 |
| 2016/0087339 A1 * | 3/2016 | Bull | ...................... | H04B 7/0617 342/367 |
| 2016/0337051 A1 * | 11/2016 | Shahramian | ......... | H04B 17/103 |
| 2017/0353254 A1 * | 12/2017 | Islam | ................... | H01Q 3/2605 |
| 2018/0278467 A1 * | 9/2018 | John Wilson | ....... | H04W 72/046 |
| 2018/0375556 A1 * | 12/2018 | Wang | ................... | H04W 16/28 |
| 2019/0090226 A1 * | 3/2019 | Wang | ................ | H04W 72/0413 |
| 2019/0097712 A1 * | 3/2019 | Singh | ................... | H04B 7/04 |
| 2019/0261344 A1 * | 8/2019 | Grant | .................... | H04B 7/088 |
| 2020/0100191 A1 * | 3/2020 | Raghavan | ............ | H04B 17/382 |

* cited by examiner

*Primary Examiner* — Nguyen T Vo

(57) ABSTRACT

Methods and systems are provided for dynamically adjusting the beamform of an antenna array. An intended beamform, which should ideally be propagated by an antenna array based on a supply of a first set of signals, may not be realized if one or more antenna elements of the antenna array are experiencing a fault. Utilizing various methods, one or more faulty antenna elements of the antenna array are identified and a second set of signals is calculated that, when propagated by one or more operational antenna elements, yield an optimized beamform, wherein the optimized beamform at least partially recovers a portion of a coverage gap.

14 Claims, 10 Drawing Sheets

DYNAMIC BEAM MANAGEMENT OF AN ANTENNA ARRAY WITH A FAULTY ELEMENT

SUMMARY

The present disclosure is directed, in part, to managing sector and service beams of an antenna array, substantially as shown in and/or described in connection with at least one of the figures, and as set forth more completely in the claims.

In aspects set forth herein, a beamform produced by an antenna array may be modified based on individual elements of the array being determined to have a fault. When functioning properly, an antenna array will be supplied with a plurality of signals configured to produce an intended beamform and produce a realized beamform substantially similar to the intended beamform. When one or more elements of the antenna array are experiencing a fault, said element(s) will emit a beamform different than that which is intended. Faults may be temporary or permanent, and so the antenna array may experience an improper beamform for various amounts of time. While the improper beamform is being realized, it is possible that user equipment (UE) within a sector/cell, served by the antenna array, may experience service disruptions. Accordingly, aspects of the present disclosure are directed to modifying one or more signals supplied to an antenna array determined to have at least one faulty element, in order that a modified beamform at least partially recaptures a coverage gap defined as the difference between the intended and realized beamforms.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
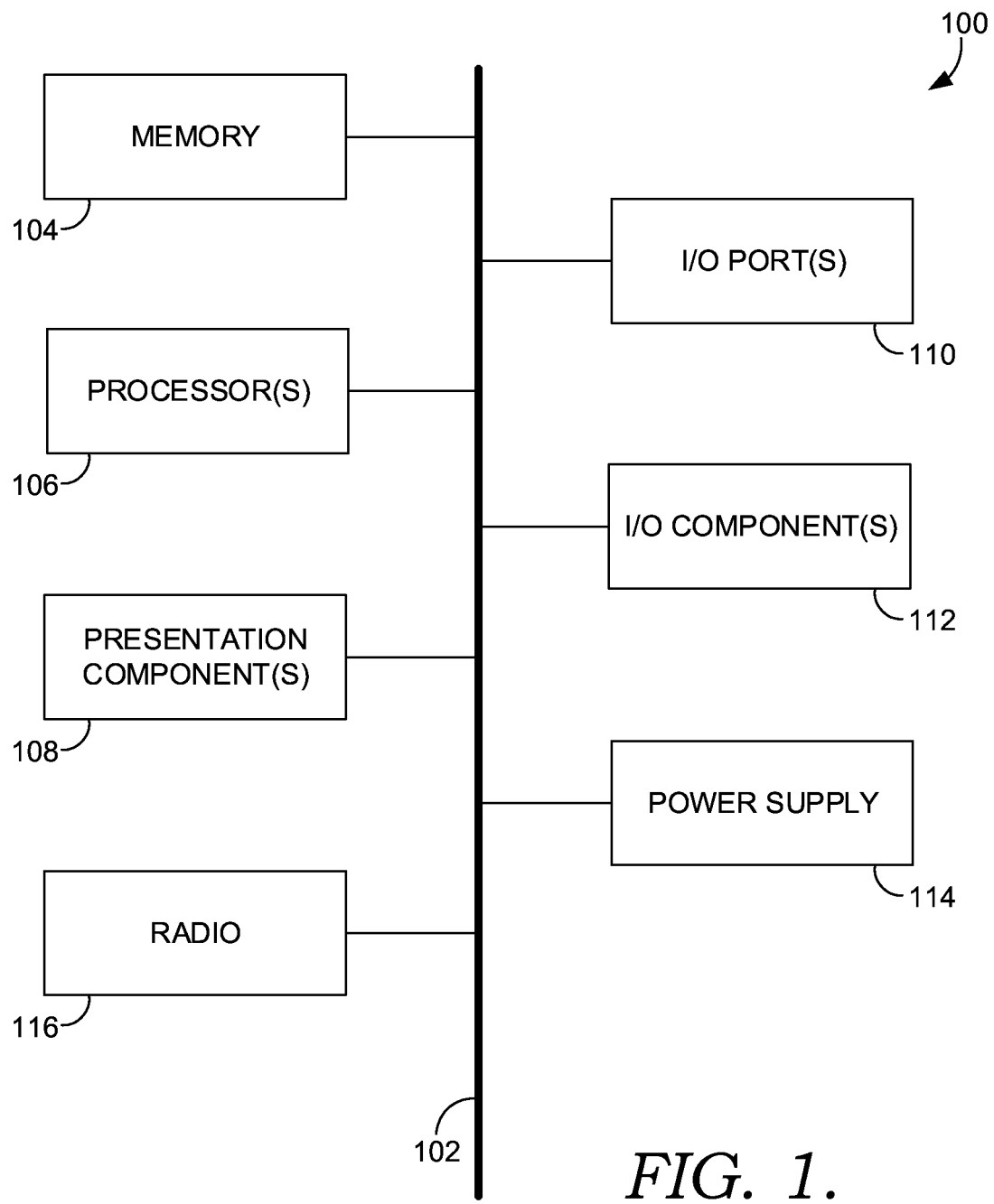
FIG. 1 depicts a diagram of an exemplary computing environment suitable for use in implementations of the present disclosure.

The subject matter of embodiments of the invention is described with specificity herein to meet statutory require- ments. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of some of these acronyms:

| | |
|---|---|
| 3G | Third-Generation Wireless Technology |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| eNodeB | Evolved Node B |
| gNodeB | Next Generation Node B |
| GIS | Geographic/Geographical/Geospatial Information System |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MD | Mobile Device |
| PC | Personal Computer |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Transmission Receive Power |
| RSRQ | Reference Transmission Receive Quality |
| RSSI | Received Transmission Strength Indicator |
| SINR | Transmission-to-Interference-Plus-Noise Ratio |
| SNR | Transmission-to-noise ratio |
| SON | Self-Organizing Networks |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 30th Edition (2016).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, nodes) to provide network coverage to a plurality of UEs within a predetermined area (e.g., a cell, or a cell sector). These base stations are employed to transmit a set of signals to UEs wishing to communicate with the network. Many factors can affect the ability of the base station to perform as intended. In some instances, a base station comprising an antenna array with a plurality of antenna elements may also include one or more faulty antenna elements. Thus, when an initial set of signals is supplied to the antenna array with the objective of propagating an intended beamform, the actual beamform may be different than the intended beamform.

Faults in antenna elements may be temporary or may be permanent. Temporary faults present a challenge in that any correction to supplied signals may not be desirable once the fault clears. Permanent faults present a challenge in that, if not corrected, they may have long-term coverage consequences.

Modern and next generation telecommunication systems may utilize antenna arrays of various size, composition, and protocols, in order to communicate between the network and the UEs. One example of such an antenna array is a multiple input multiple output (MIMO) antenna system. A MIMO base station may include multiple antennas and transmitters that propagate a transmitted signal. Such a base station may be used to create service beams and sector beams, among others. A service beam, as referred to herein, is a beam/lobe used to carry communication and data payloads to a limited number of UEs via a wireless RF signal. In some aspects, service beams may be said to have beams/lobes that provide coverage to less than 50% of the sector covered by the base station's antenna array. A sector beam, as referred to herein, is a beam/lobe used to carry administrative, protocol, and other packets having a bandwidth less than communication and data payloads. For example, a base station may utilize a sector beam to transmit control signal information, or any other information that will be needed by all of the UEs within the sector in order to effectively communicate with the base station. In some aspects, sector beams may be said to have beams/lobes that provide coverage to at least 50% of the sector.

Accordingly, it is important for network effectiveness that the base station is able to appropriately propagate service and sector beams to the plurality of UEs within the sector. In accordance with embodiments described herein, an intended beamform may be determined based on a first set of signals supplied to the antenna array. Various feedback and/or interrogatory processes may be used to determine that a realized beamform, actually produced by the antenna array is different than the intended beamform. If the difference is due to one or more faulty elements of the array, a second set of signals may be determined that, when supplied to the antenna array, adapt the realized beamform to become an optimized beamform, wherein the optimized beamform is capable of at least partially recapturing the coverage gap created between the intended and realized beamforms.

As employed herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station. A UE may be, in an embodiment, similar to device 100 described herein with respect to FIG. 1.

Accordingly, in a first aspect of the present disclosure, an embodiment is directed to a system for dynamically managing a beamform of an antenna array, the system comprising an antenna array comprising a plurality of antenna elements and a computer processing component configured to: determine an intended beamform created by a first set of signals supplied to the antenna array; determine that a realized beamform emitted by the antenna array is different than the intended beamform due to one or more antenna elements of the antenna array having a fault; and determine a second set of signals supplied to the antenna elements of the antenna array excluding the one or more antenna elements of the antenna having a fault, to create an optimized beamform, wherein subsequent to determining the optimized beamform, the antenna array emits the optimized beamform based on the supplied second set of signals.

In a second aspect of the present disclosure, an embodiment is directed to a method for optimizing a beamform of an antenna array. The method includes determining an intended beamform created by a first set of signals supplied to an antenna array comprising a plurality of antenna elements; determining that a realized beamform emitted by the antenna array is different than the intended beamform due to one or more antenna elements of the antenna array having a fault; determining a second set of signals supplied to the antenna elements of the antenna array excluding the one or more antenna elements of the antenna having a fault, to create an optimized beamform; and communicating an instruction to the antenna array to emit the second set of signals.

In a third aspect, an embodiment is directed to a non-transitory computer storage media storing computer-usable instructions that, when used by one or more processors, cause the one or more processors to determine an intended beamform created by a first set of signals supplied to an antenna array comprising a plurality of antenna elements; determine that a realized beamform emitted by the antenna array is different than the intended beamform due to one or more antenna elements of the antenna array having a fault; determine a second set of signals supplied to the antenna elements of the antenna array excluding the one or more antenna elements of the antenna array having a fault, to create an optimized beamform; and communicate an instruction to emit the second set of signals.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
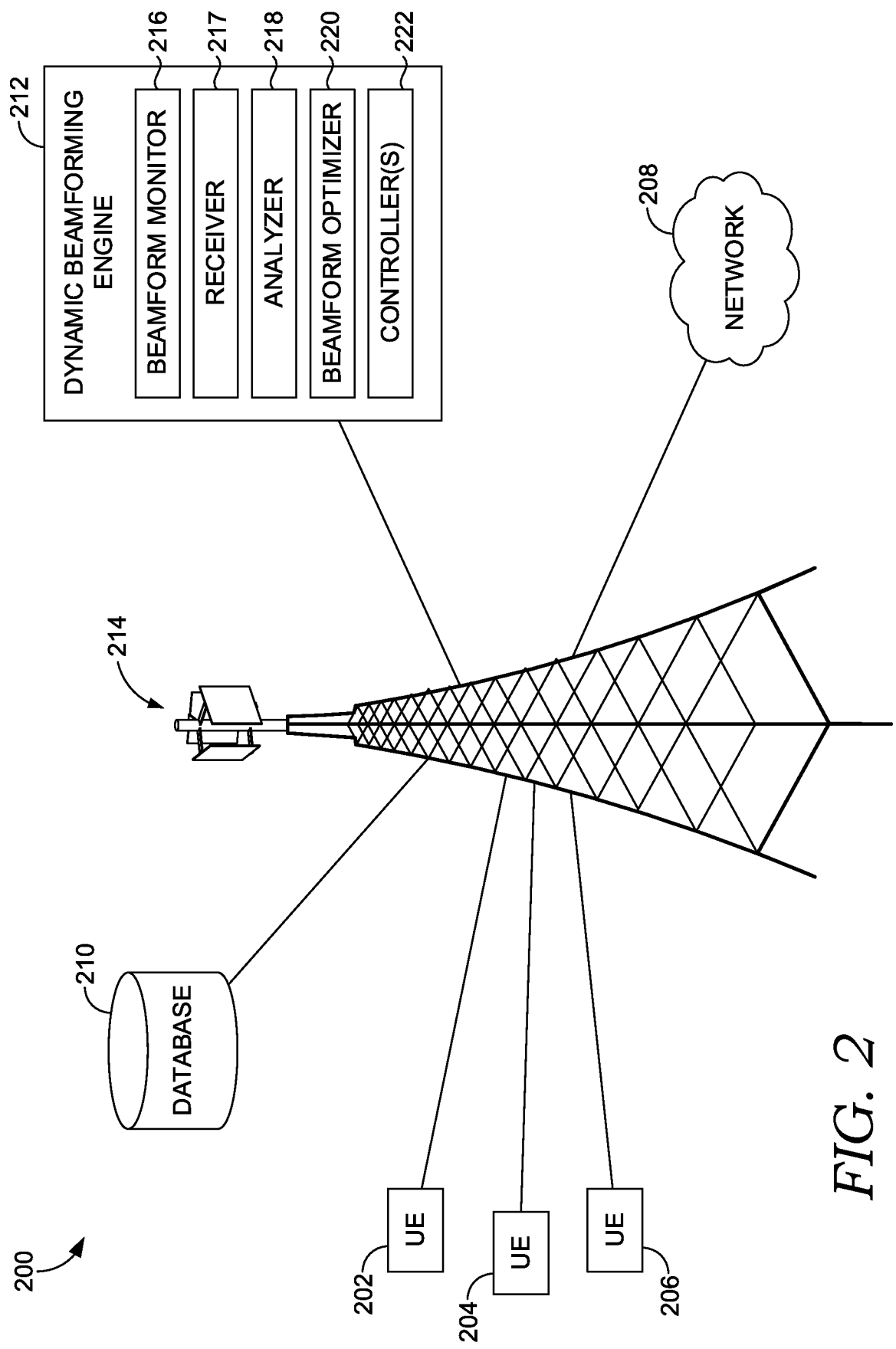
FIG. 2 illustrates an exemplary network environment suitable for use in implementations of the present disclosure.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), cell site 214, network 208, database 210, and dynamic beamforming engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, cell site 214 is configured to communicate with user devices, such as user devices 202, 204, and 206 that are located within the geographical area, or cell, covered by the one or more base stations of cell site 214. Accordingly, cell site 214 may include one or more base stations, base transmitter stations, radios, antennas, antenna arrays, power amplifiers, transmitters/receivers, digital signal processors, control electronics, GPS equipment, and the like. For example, a cell site may comprise multiple base stations, each base station comprising a wireless communication node (e.g., eNodeB, gNodeB, and the like) configured to utilize a MIMO antenna array (e.g., an array having 64 transmit elements) to communicate a wireless downlink signal to one or more UEs according to one or more communication protocols (e.g., 5G). In particular, a base station of cell site 214 may communicate with one or more of the user devices using a service beam and/or a sector beam, as defined herein. Conventionally, it is assumed that all the antenna elements of an antenna array are functioning properly, and so a set of signals configured to propagate an intended beamform, when supplied to an antenna array having one or more faulty antenna elements, may not propagate the beamform as intended. The distorted beamform may cause one or more of the UEs to experience weak/no downlink signal, low signal quality, dropped calls, or connection/call failures.

As shown, cell site 214 is in communication with dynamic beamforming engine 212, which comprises various components that are utilized, in various implementations, to perform one or more methods for dynamically adjusting the signals supplied to the antenna array so that an optimized beam at least partially recaptures a coverage gap, wherein the coverage gap is created by the difference in an intended beamform and a realized beamform due to one or more faulty antenna elements. In some implementations, dynamic beamforming engine 212 comprises components including a beamform monitor 216, a receiver 217, an analyzer 218, a beamform optimizer 220, and one or more power supply controllers 222. However, in other implementations, more or less components than those shown in FIG. 2 may be utilized to carry out aspects of the invention described herein. The dynamic beamforming engine 212 may be a distinct component, physically collocated with, near to, or distant from the cell site 214 but communicatively coupled thereto. In other aspects, the dynamic beamforming engine may be a component or process of a wireless communication node, such as an eNodeB, which is communicatively coupled to the antenna array.

The beamform monitor 216 of the dynamic beamforming engine 212 can monitor a first set of signals that are supplied to the antenna array. The first set of signals is supplied to the antenna array under the assumption that every antenna element of the antenna array is fully operational. By monitoring the first set of signals, the beamform monitor 216 may determine an intended beamform, that is, an area served by the antenna array if all antenna elements were operational. In other aspects, the beamform monitor may be configured to monitor information from an external source, such as a signal controller, that provides the intended beamform information without converting it from the first set of signals.

The receiver 217 of the dynamic beamforming engine 212 can, among other things, receive information that indicates at least one antenna element of the antenna is faulty. In one aspect, the receiver 217 may receive information from one or more UEs, that should be within the intended beamform but are experiencing a degradation or change in one or more network parameters (e.g., SINR, signal strength, signal quality, call drop rate, connection drop rate, and the like), which may be indicative of a faulty antenna element in the antenna array. In another aspect, the receiver 217, or any other component of the dynamic beamforming engine 212 may periodically query a base station or antenna array of the cell site 214 in order to determine an operational status of each antenna element of the antenna array. In yet another aspect, the base station or antenna array of the cell site 214 may periodically self-report an operation status of each antenna element of the antenna array to the receiver 217.

The analyzer 218 can, among other things, determine whether an antenna element is experiencing a fault and provide a fault report to the beamform optimizer 220. The analyzer 218 can utilize the information received by the receiver 217 to determine a likelihood that a particular antenna element is experiencing a fault. The fault could be an electrical fault, physical fault, or any other condition that results in the faulty antenna element not propagating the first set of signals as intended. In aspects, the analyzer 218 may determine a likelihood that each antenna element of the antenna array is experiencing a fault and, if that likelihood is above a threshold (e.g., 50%), outputting a conclusion that the relevant antenna element is faulty. In some aspects, once the analyzer 218 has determined that one or more antenna elements are faulty, it may determine how the faulty antenna has affected the realization of the intended beamform. In other words, the analyzer 218 can consider the one or more faulty antenna elements when determining/estimating a realized beamform (i.e., the beamform that is actually propagated by the antenna array and experienced by the one or more UEs).

The beamform optimizer 220 can, among other things, utilize information from the other components of the dynamic beamforming engine 212 to determine an optimized beamform. In aspects, the beamform optimizer 220 can compare information relating to the intended beamform and the realized beamform to identify a coverage gap, wherein the coverage gap is defined as a geographic area difference between a geographic area that would have been covered by the intended beamform and a geographic area that is actually covered by the realized beamform. Once the beamform optimizer 220 has determined the coverage gap, it may utilize information about the faulty antenna elements to determine which antenna elements of the array are operational, and determine a second set of signals that can be propagated by the operational antenna elements in order to at least partially recover the coverage gap. In aspects, the analyzer 220 may determine the second set of signals such that the entire coverage gap is recaptured by the optimized beamform.

The analyzer 220 can utilize any combination of physical and electronic modifications in order to produce the second set of signals. For example, the analyzer 220 may determine that physically tilting or steering the antenna array or individual operational antenna elements may be sufficient to accompany the second set of signals. In another example, the analyzer 220 may determine that one or more electronic modifications (e.g., power, phase) can be applied to the first set of signals in order to arrive at a second set of signals that will produce the optimized beamform. In some aspects, the beamform optimizer may further take into account positions of one or more UEs located within the cell in order to determine if only a portion of the coverage gap needs to be recaptured. For example, if no UEs are located in an edge portion of the coverage gap, the second set of signals could be used to recapture a portion of the coverage gap that excludes the edge portion. The beamform optimizer 220 may be further configured to communicate information relating to the second set of signals to the controller(s) 222.

The controller 222 is generally responsible for executing the propagation of the second set of signals provided from the beamform optimizer 220. In aspects, the controller 222 may determine and communicate propagation instructions to a node or subsequent controller that, in turn, directly controls physical characteristics of the array or operational antenna elements and/or what signals are supplied to the operational antenna elements of the antenna array. In other aspects, the controller 222 may directly control the signal(s) provided to each of the operational antenna elements of the antenna array. Whether the controller 222 directly or indirectly provides propagation instructions to the operational antenna elements, the result is that the antenna array emits the optimized beamform based on the supplied second set of signals.

Figure 3A:
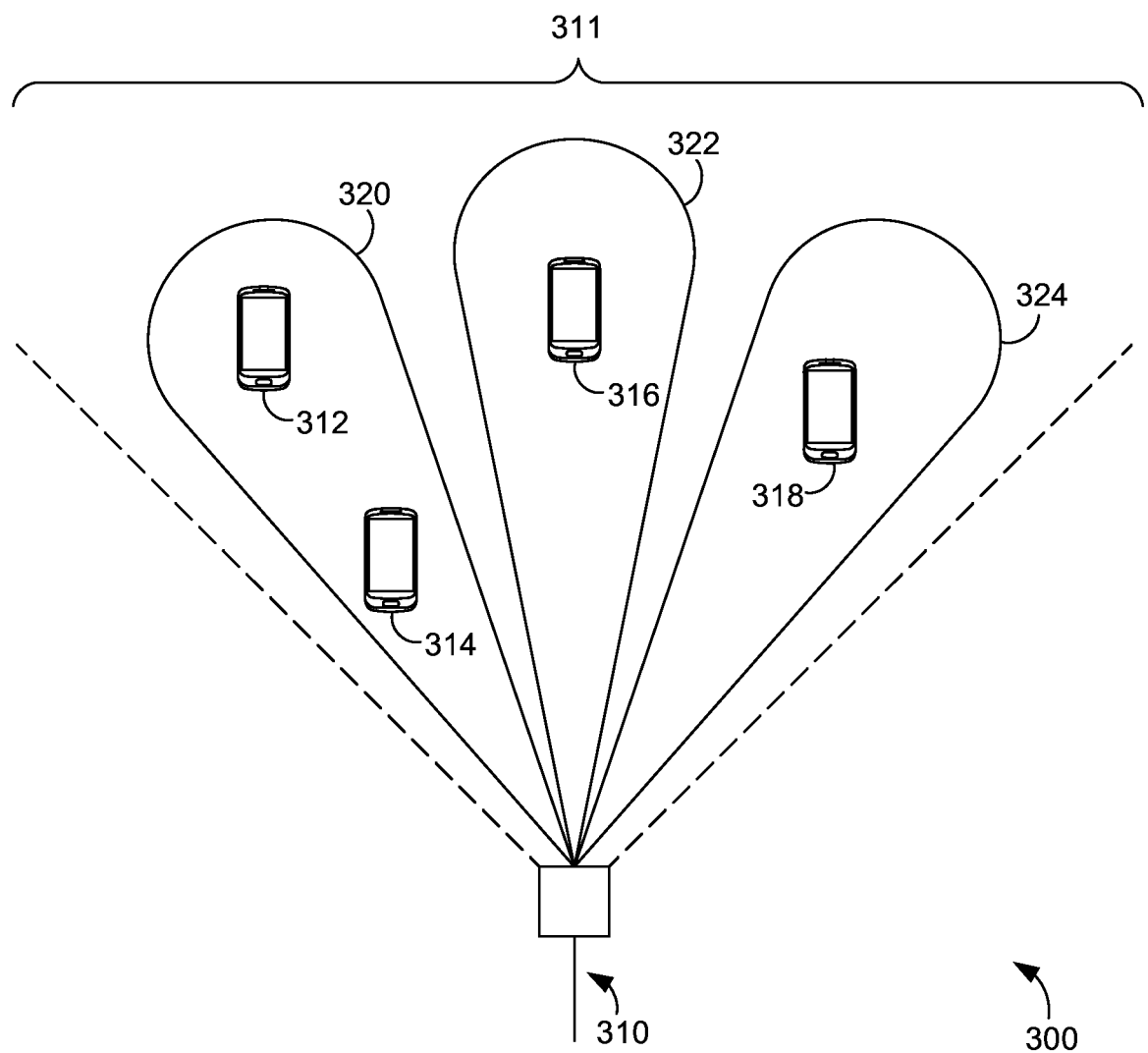
FIG. 3A-3B illustrate a diagram of service beamforms produced by an antenna array in accordance with aspects herein.
Figure 3B:
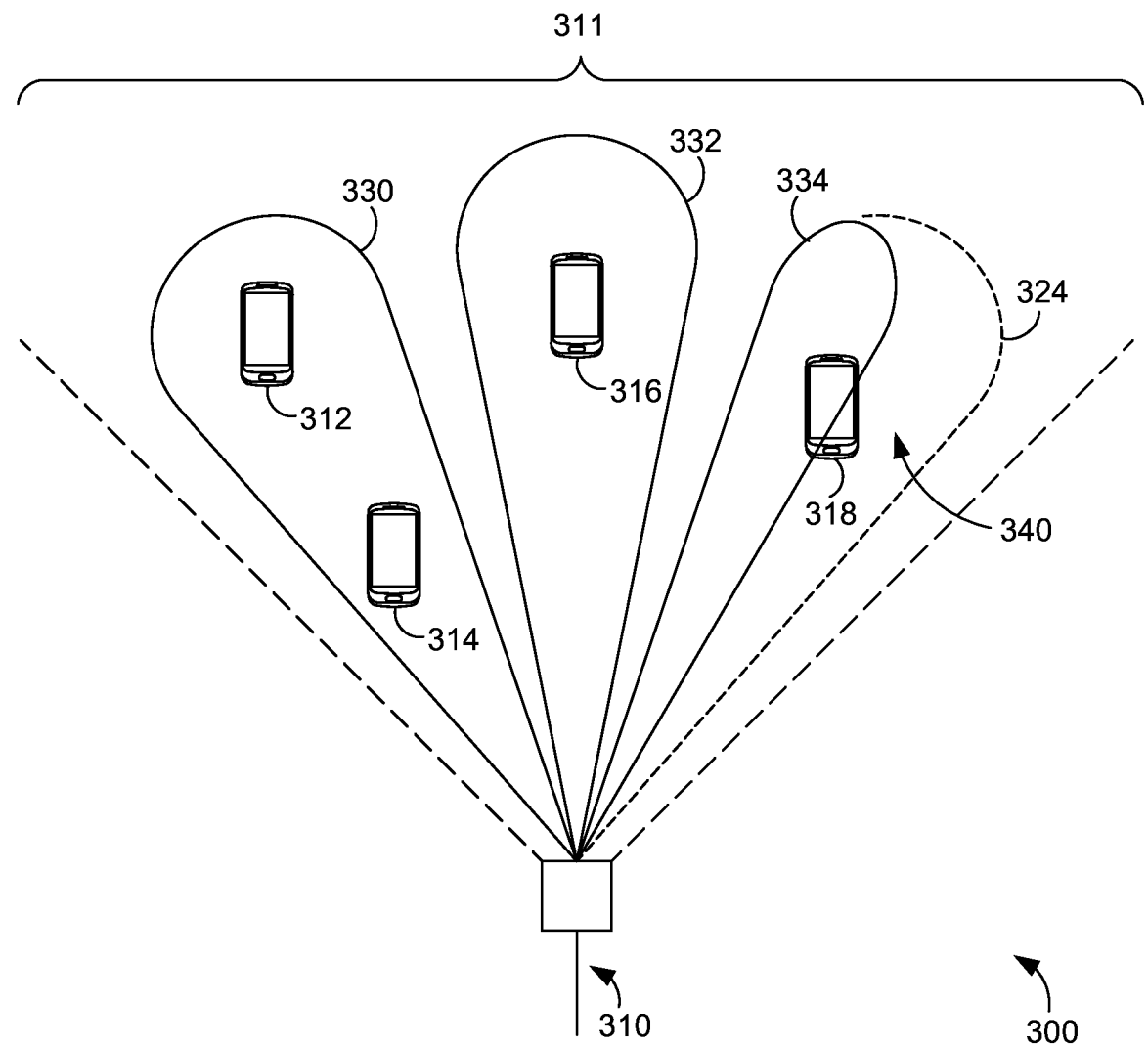

Turning now to FIGS. 3A and 3B, a system 300 comprises an exemplary base station 310, which is depicted as using a plurality of service beams to communicate with a plurality of UEs 312, 314, 316, 318 within a sector 311. In aspects, the system 300 may comprise any one or more features of the system 200 of FIG. 2; for example, the base station 310 of system 300 may be at least a portion of the cell site 214 of the system 200. As illustrated by FIGS. 3A and 3B, a single service beam, such as the first intended service beam 320, may provide coverage for a plurality of UEs, such as a first UE 312 and a second UE 314. A single service beam, such as the second intended service beam 322 may provide coverage for a single UE, such as the third UE 316. With respect to FIG. 3A, an third intended service beam 324 is depicted as representing an intended third service beam that would have provided coverage for a fourth UE 318 under fully operational circumstances.

With respect to FIG. 3B, a realized set of beamforms is illustrated as being propagated by the base station 310. In one example of how faulty antennas could result in undesirable propagation of a service beam, a comparison of FIGS. 3A and 3B depicts how a first realized beamform 330 is substantially the same as the first intended beamform 320 and how a second realized beamform 332 is substantially the same as the second intended beamform 322; however, the third realized beamform 334 is not similar to the third intended beamform 324 in that the fourth UE 318 is located on the edge of the third realized beamform 334. By being located on the edge of the third realized beamform 334, the fourth UE 318 may experience degraded service, such as dropped calls, connection failures, lower SINR, degraded signal quality, reduced signal strength, or the like. In other aspects, the fourth UE 318 may be wholly located in a coverage gap 340, defined as an area which is the difference between an intended beamform, such as the third intended beamform 324, and a realized beamform, such as the third realized beamform 334. If the fourth UE 318 is accordingly disposed it may have additional service disruptions, relative to if it were disposed on the edge of the third realized service beam 324.

Figure 4A:
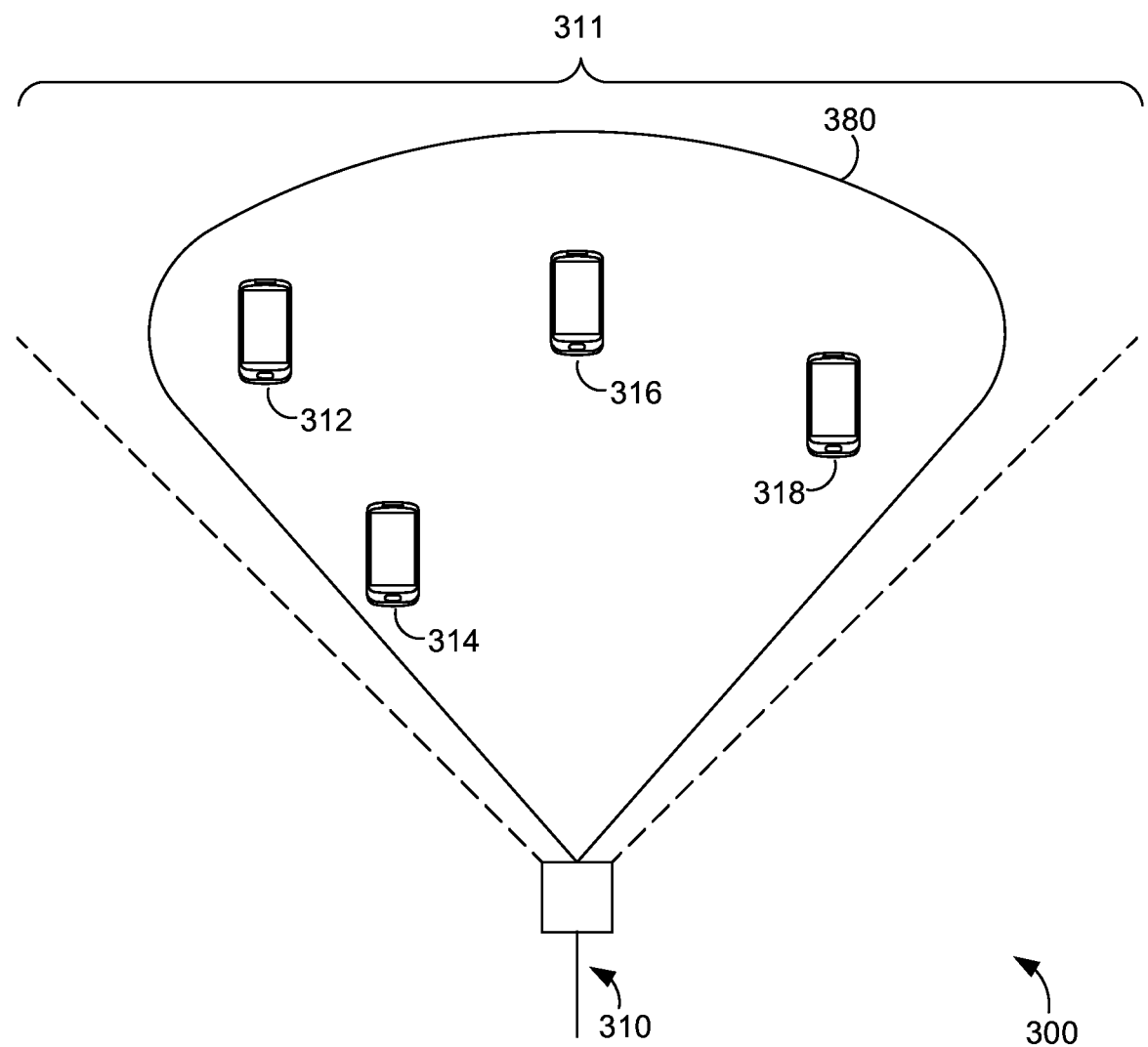
FIGS. 4A-4B illustrate a diagram of sector beamforms produced by the antenna array in accordance with aspects herein.

Turning now to FIG. 4A, the system 300 is shown as propagating an intended sector beamform 380. As discussed above, the base station 310 may propagate service beams, used to communicate data between the base station 310 and a plurality of UEs 312, 314, 316, 318, such as those illustrated in FIGS. 3A and 3B. The base station 310 may additionally or alternatively propagate a sector beam, used to transmit various information to the plurality of UEs within the sector 311. As in FIG. 3A, FIG. 4A illustrates how the intended sector beam 380 may encompass all, or substantially all, of the plurality of UEs within the sector 311 when the antenna array of the base station 310 is fully operational. As used herein, the term sector beam may be used to describe a beam simultaneously propagated to over 50% of the sector 311.

Figure 4B:
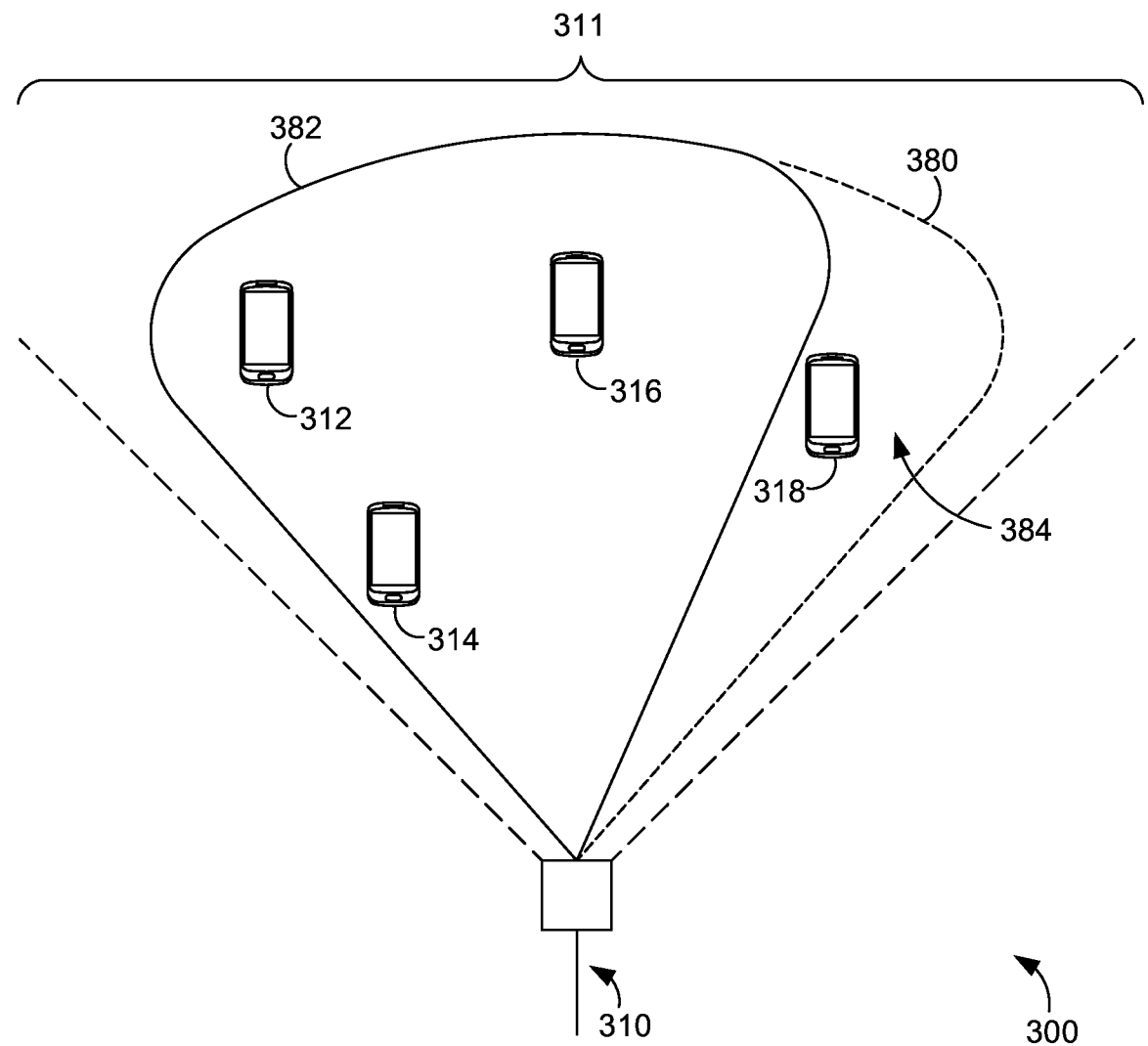

With respect to FIG. 4B, a realized sector beam is illustrated as being propagated by the base station 310. In one example of how faulty antenna elements could result in undesirable propagation of a sector beam, a comparison of FIGS. 4A and 4B depicts how a realized sector beamform 382 is different than the intended sector beamform 380. A sector coverage gap 384 may be defined as an area which is the difference between the intended sector beamform 380 and the realized sector beamform 382. That is, the coverage gap 384 is at least a portion of the intended sector beamform 380 that is excluded from the realized sector beamform 382. By being located wholly within the sector coverage gap 384, the fourth UE 318 may lack the administrative or technical information necessary to establish or maintain a connection to the base station 310 and thus the wireless network. Accordingly, the fourth UE 318 may experience connection failures and call drops, among other undesirable effects. It should be noted, that even though the fourth UE 318 is depicted as being holy disposed within the sector coverage gap 384, the fourth UE may still be likely to experience difficulties communicating with the base station 310 if it is disposed on or near an edge of the realized sector beamform 382.

Figure 5:
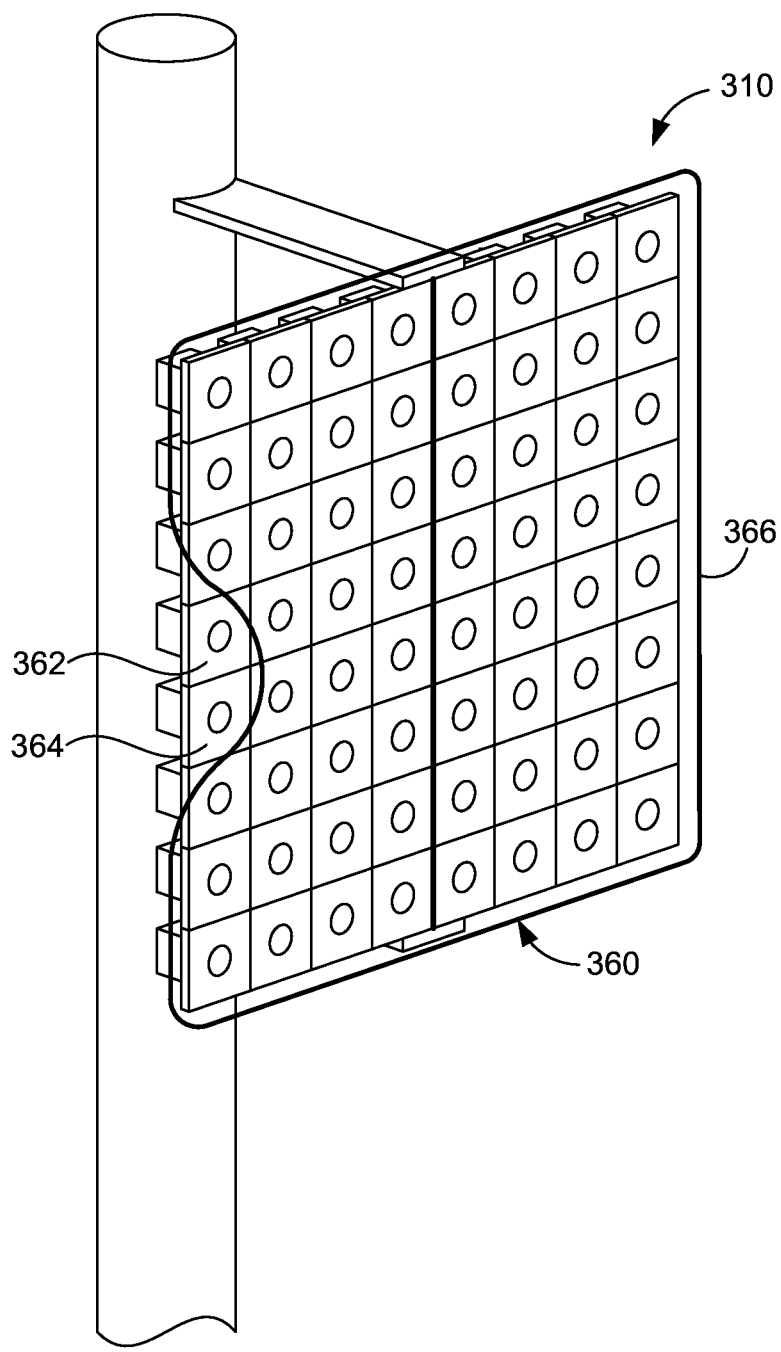
FIG. 5 depicts an antenna array in accordance with aspects herein.

Turning now to FIG. 5 the base station 310 is illustrated in greater detail. The base station 310 may be said to comprise a plurality of individual antenna elements 360, an operational group of antenna elements 366, a first faulty antenna element 362, and a second faulty antenna element 364. Only two antenna elements are depicted as being faulty in FIG. 5 for simplicity; however, it is expressly contemplated that as few as one antenna element may be faulty, or as many as all but one antenna element of the antenna array may be faulty. Further, despite the first faulty antenna element 362 and the second faulty antenna element 364 being located adjacent to one another, the one or more faulty antenna elements of the antenna array may be distributed in any manner. In some aspects, the same faulty antenna elements may cause the coverage gap 340 and the sector coverage gap 384; in other aspects, different faulty antenna elements may be to blame for the different coverage gaps. For example, an electrical fault in the first faulty antenna element 362 and a physical fault in the second faulty antenna element 364 may cumulatively result in the third intended service beamform 324 being distorted, upon propagation, and instead produce the third realized service beamform 334. Likewise, the first and second faulty antenna elements 362, 364 may cumulatively result in the intended sector beamform 380 being distorted, upon propagation, and instead produce the realized sector beamform 382. The system 300 of FIGS. 3A-4B, utilizing features of the system 200 of FIG. 2, may determine that a fault either exists or is likely to exist in each of the first faulty antenna element 362 and the second faulty antenna element 364 of the base station 310 of FIG. 5. Once the one or more faulty antenna elements has been identified, the remaining antenna elements may be said to comprise the operational antenna element group 366. Subsequent to the identification of the faulty and operational antenna elements, a second set of signals may be determined that, when exclusively supplied to and propagated by the operational antenna element group 366, may recapture at least a portion of the coverage gap 340 of FIG. 3B and/or the sector coverage gap 384 of FIG. 4B. Such a recapture process may be carried in one dimension (e.g., in the E-plane or the H-plane), or may be multi-dimensional (e.g., a combination of the E-plane and the H-plane, or a three dimensional beam).

Figure 6:
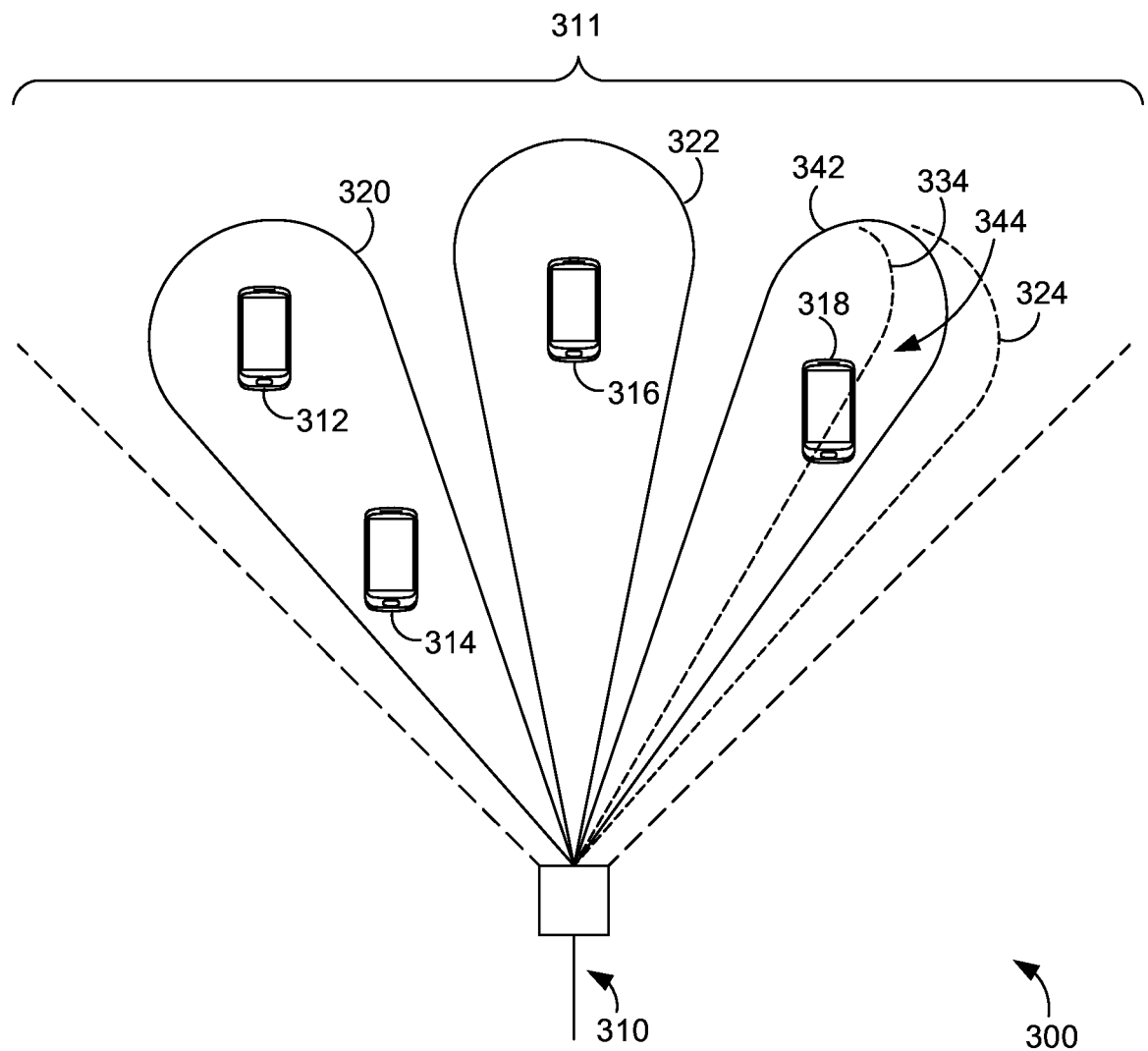
FIG. 6 depicts a modified service beamform produced by the antenna array in accordance with aspects herein.

Turning now to FIG. 6, an illustration of the effect of propagating the optimized service beamform is provided. In aspects, such as the one shown in FIG. 6, the base station may supply a second set of signals to the operational antenna element group 366 of FIG. 5 in order to partially recapture (i.e., recapture a portion of) the coverage gap 340 of FIG. 3B. As a result, the base station 310 may be said to propagate an optimized service beamform 342. The optimized service beamform 342 may provide coverage within a recapture area 344, defined as the difference between the third realized service beamform 334 and the optimized service beamform 342. As seen in FIG. 6, when the fourth UE 318 is disposed within the recapture area 344, it may experience significant improvements in one or more network parameters, as defined herein. In other aspects, the optimized service beamform 342 may provide coverage for the entire coverage gap 340; that is, that the recapture area 344 is equal to the coverage gap 340. In other aspects, the system 300 may determine that full recapture of the coverage gap 340 is not possible (e.g., due to the number and distribution of the antenna elements comprising the operational antenna element group 366), in which case, partial recapture may be executed.

Figure 7:
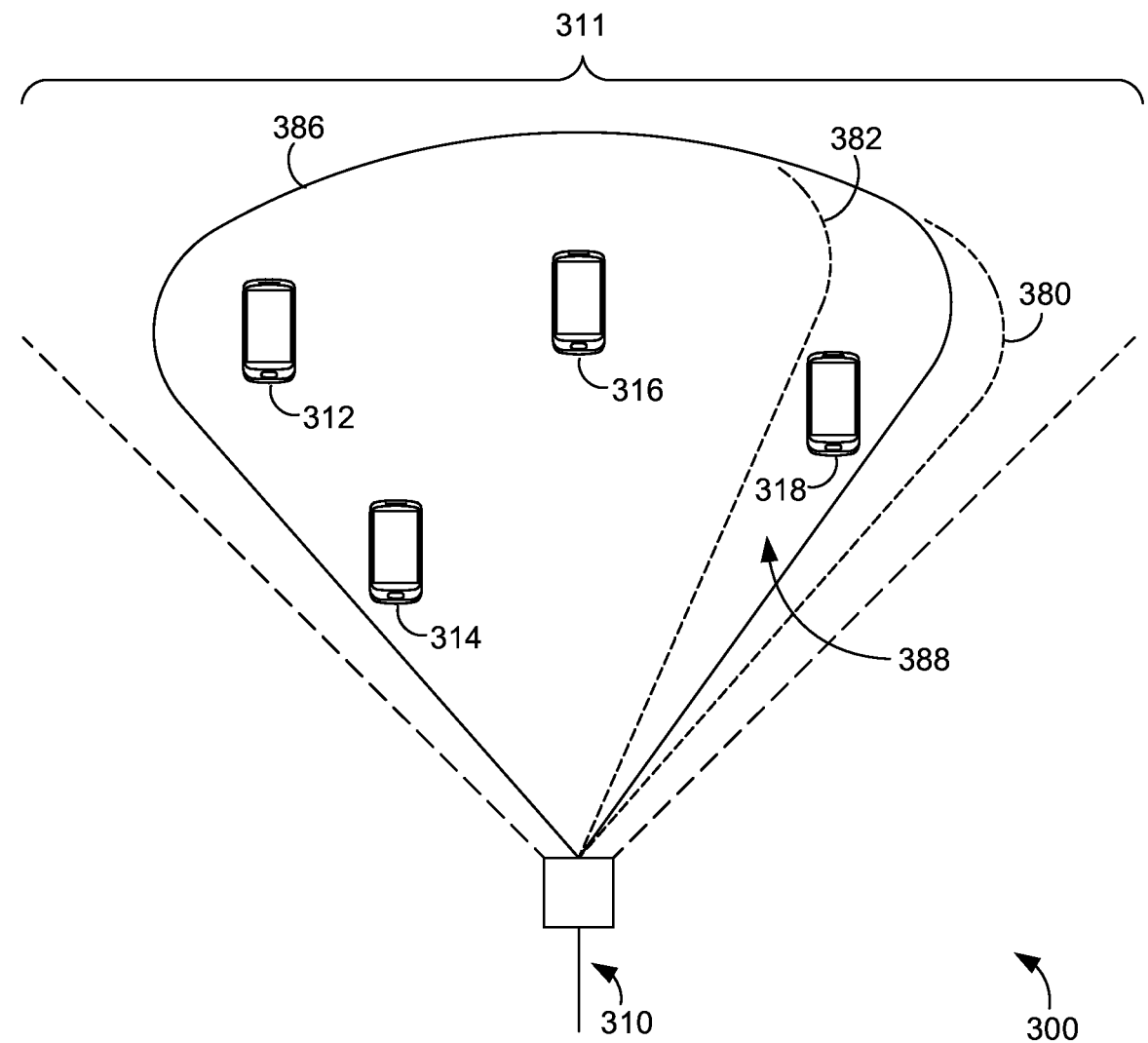
FIG. 7 depicts a modified sector beamform produced by the antenna array in accordance with aspects herein.

Similarly, with respect to FIG. 7, an illustration of the effect of propagating the optimized sector beamform is provided. In aspects, such as the one shown in FIG. 7, the base station may supply a second set of signals to the operational antenna element group 366 of FIG. 5 in order to partially recapture (i.e., recapture a portion of) the sector coverage gap 384 of FIG. 4B. As a result, the base station 310 may be said to propagate an optimized sector beamform 386. The optimized sector beamform 386 may provide coverage within a sector recapture area 388, defined as the difference between the realized sector beamform 382 and the optimized service beamform 386. As seen in FIG. 7, when the fourth UE 318 is disposed within the sector recapture area 388, it may receive information from the base station 310, necessary to connect and communicate with the wireless network. In other aspects, the optimized sector beamform 386 may provide coverage for the entire coverage gap 384; that is, that the sector recapture area 388 is equal to the sector coverage gap 388. In other aspects, the system 300 may determine that full recapture of the sector coverage gap 384 is not possible (e.g., due to the number and distribution of the antenna elements comprising the operational antenna element group 366), in which case, partial recapture may be executed. In yet other aspects, the system 300 may determine that the full recapture of the sector coverage gap 384 is not necessary because of a determination or receipt of information that no UEs are located beyond a certain portion of the sector coverage gap 384.

Figure 8:
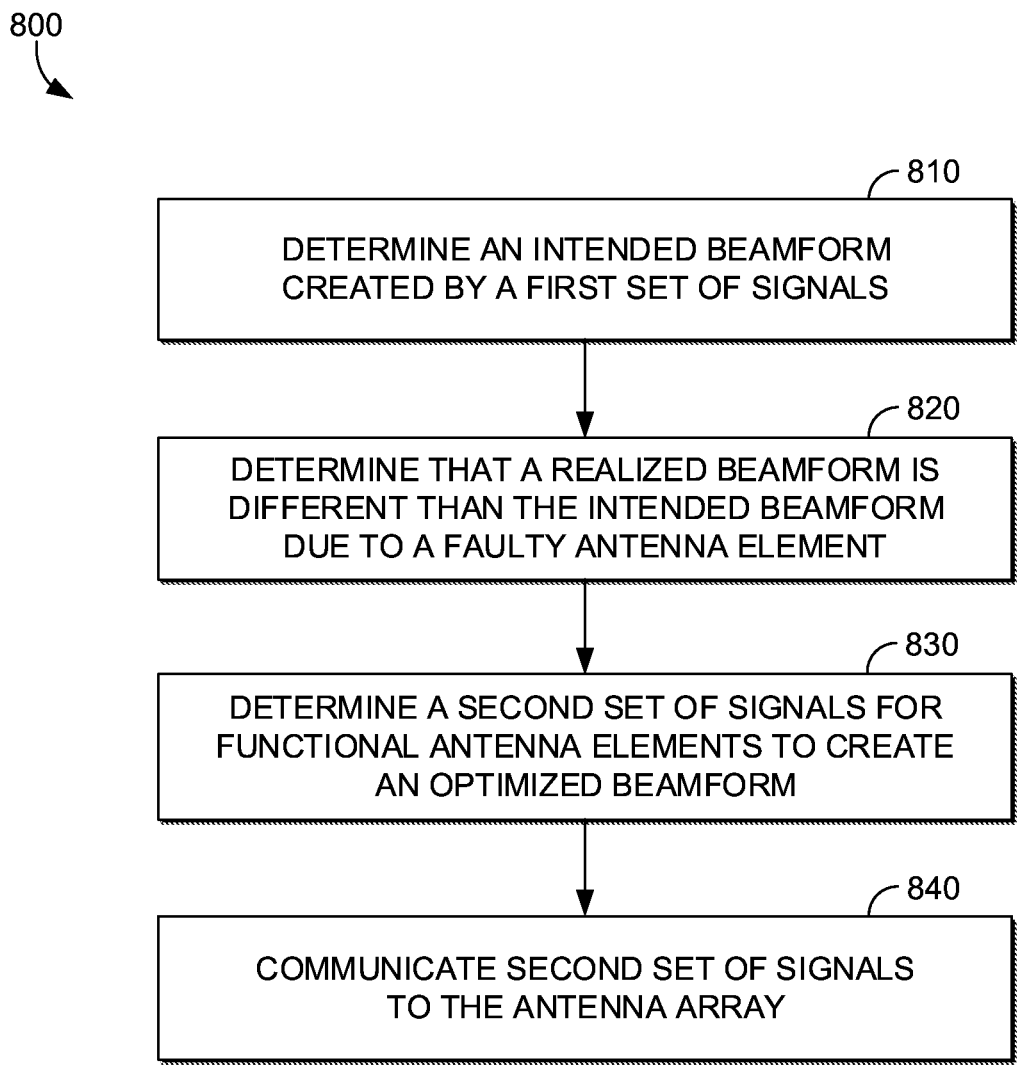
FIG. 8 illustrates an exemplary method for dynamically adjusting a propagated beamform based on a determination of at least one faulty antenna element in accordance with implementations of the present disclosure.

Turning now to FIG. 8, a flow diagram is illustrated of an exemplary method 800 for dynamically optimizing a beamform of an antenna array that comprises one or more faulty antenna elements, in accordance with implementations of the present disclosure.

Initially at block 810, an intended beamform that should ideally be propagated by an antenna array based on a first set of signals is determined. As described above, the first set of signals is supplied to the at least a portion of the antenna array with the intent of propagating an intended beamform, whether a service beamform or a sector beamform. In aspects, the first set of signals could be determined using one or more measurement devices that may indicate the physical and/or electrical attributes of each antenna element of an antenna array or the signals propagated thereby. In other aspects, the system or network in which the method 800 is being performed may communicate a data set or some other form of information to one or more computer processing components, which in turn, may use the data set to determine the intended beamform.

At block 820, a realized beamform is determined to be different than the intended beamform (determined in block 810) due to one or more faulty antenna elements. In aspects, the realized beamform may be determined based upon one or more reports from an antenna array or the individual antenna elements thereof that one or more antenna elements of the antenna array are experiencing a physical or logical fault. Based on the receipt of the fault information, a computer processing component may determine a realized beamform based on the assumption that the one or more faulty antenna elements is completely nonfunctional. The computer processing component determining the realized beamform may comprise a standalone beamforming engine, distinct from the base station or telecommunication nodes, or it may be performed by the wireless telecommunication node and/or base station itself. In other aspects, the realized beamform may be determined based on feedback from a plurality of UEs within a sector covered by the base station. This may be accomplished based on receipt of information from one or more of the plurality of UEs that the downlink signal from the base station is experiencing degraded network parameters (e.g., degraded signal quality and/or signal strength of the downlink signal propagated by the base station, increases in connection drops, increases in call failure rates, or the like).

At block 830, a second set of signals are determined the may be supplied to the operational antenna elements to create an optimized beamform. In order to determine the optimized beamform, a comparison may be made between the intended beamform and the realized beamform, wherein that difference defines a coverage gap. Utilizing information about the dimensions of the coverage gap, the location of UEs within the coverage gap/sector, and/or the number and location of faulty antenna elements, it may be determined whether an optimized beamform should be propagated to recapture a portion of the coverage gap or the entire coverage gap. Once the optimized beamform has been determined, a second set of signals may be calculated based on the premise that the second set of signals are only to be propagated by the operational antenna elements that, when propagated by the operational antenna elements, producing optimized beamform that recaptures the predetermined amount of the coverage gap.

At block 840, the second set of signals is communicated to the antenna array. In aspects, said communication may originate from a standalone computer processing component wherein at least a portion of the method 800 is executed. In other aspects, the communication may originate from a wireless telephone indications node or other base station controller. Regardless of the source, the communication is an instruction to one or more of the operational antenna elements to propagate its respective portion of the second set of signals. Once instructed, the relevant operational antenna elements may emit/propagate the appropriate signal, realizing the optimized beamform and recapturing at least a portion of the coverage gap.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for optimizing a beamform of an antenna array, the method comprising:
   determining an intended beamform created by a first set of signals supplied to the antenna array, wherein the antenna array comprises a plurality of antennas, the intended beamform transmitted to a first geographic area, wherein one or more UEs are disposed in the first geographic area;
   determining, based on information that at least one of the one or more UEs disposed within the first geographic area is experiencing a wireless service degradation, that a realized beamform emitted by the antenna array is different than the intended beamform, wherein the wireless service degradation comprises at least one of a change to a signal to interference noise ratio (SINR), receive signal receive power (RSRP), receive signal receive quality (RSRQ), call drop rate, or connection drop rate;
   receiving location information from each of the one or more UEs disposed within the first geographic area;
   determining that the realized beamform emitted by the antenna array is different than the intended beamform due to one or more antenna elements of the antenna array having a fault;
   based on the location information from each of the one or more UEs disposed within the first geographic area, determining a second set of signals supplied to the antenna elements of the antenna array excluding the one or more antenna elements of the antenna having a fault that modify the realized beamform by creating an optimized beamform, wherein the optimized beamform corresponds to a second geographic area comprising each of the one or more UEs, the second geographic area being only a portion of the first geographic area; and
   communicating an instruction to the antenna array to emit the second set of signals.

2. The method of claim 1, wherein each of the intended beamform, the realized beamform, and the optimized beamform comprises a sector beam.

3. The method of claim 1, wherein each of the intended beamform, the realized beamform, and the optimized beamform comprises a service beam.

4. The method of claim 1, wherein the fault is determined based on a fault report being communicated from the antenna array to a computer processing component.

5. A non-transitory computer storage media storing computer-usable instructions that, when used by one or more processors, cause the one or more processors to:
   determine an intended beamform created by a first set of signals supplied to an antenna array, wherein the antenna array comprises a plurality of antennas, the intended beamform transmitted to a first geographic area, wherein one or more UEs are disposed in the first geographic area;
   determine, based on information that at least one of the one or more UEs disposed within the first geographic area is experiencing a wireless service degradation, that a realized beamform emitted by the antenna array is different than the intended beamform, wherein the wireless service degradation comprises at least one of a change to a signal to interference noise ratio (SINR), receive signal receive power (RSRP), receive signal receive quality (RSRQ), call drop rate, or connection drop rate;

receive location information from each of the one or more UEs disposed within the first geographic area;

determine that realized beamform emitted by the antenna array is different than the intended beamform due to one or more antenna elements of the antenna array having a fault;

based on the location information from each of the one or more UEs disposed within the first geographic area, determine a second set of signals supplied to the antenna elements of the antenna array excluding the one or more antenna elements of the antenna having a fault that modify the realized beamform by creating an optimized beamform, wherein the optimized beamform corresponds to a second geographic area comprising each of the one or more UEs, the second geographic area being only a portion of the first geographic area; and communicate an instruction to the antenna array to emit the second set of signals.

6. The non-transitory computer storage media of claim 5, wherein the fault is determined based on a report received from the antenna array, the report comprising information that one or more faulty antennas of the antenna array is not radiating a signal of the first set of signals.

7. A wireless telecommunication system, the system comprising:

an antenna array comprising a plurality of antenna elements, wherein the plurality of antenna elements consists of a first set of antenna elements and a second set of antenna elements, the first set of antenna elements being discrete from the second set of antenna elements; and a computer processing component configured to:

determine an intended beamform created by a first set of signals supplied to the plurality of antenna elements, the intended beamform transmitted to a first geographic area, wherein one or more UEs are disposed in the first geographic area;

determine, based on information that at least one of the one or more UEs disposed within the first geographic area is experiencing a wireless service degradation, that a realized beamform emitted by the antenna array is different than the intended beamform, wherein the wireless service degradation comprises at least one of a change to a signal to interference noise ratio (SINR), receive signal receive power (RSRP), receive signal receive quality (RSRQ), call drop rate, or connection drop rate;

receive location information from each of the one or more UEs disposed within the first geographic area;

determine that the realized beamform emitted by the antenna array is different than the intended beamform due to each of the second set of antenna elements of the plurality of antenna elements having a fault;

based on the location information from each of the one or more UEs disposed within the first geographic area, determine a second set of signals supplied to the first set of antenna elements of the plurality of antenna elements that modify the realized beamform by creating an optimized beamform, wherein the optimized beamform corresponds to a second geographic area comprising each of the one or more UEs, the second geographic area being only a portion of the first geographic area; and instruct one or more control components to supply the first set of antenna elements with the second set of signals.

8. The system of claim 7, wherein each of the intended beamform, the realized beamform, and the optimized beamform comprises a sector beam.

9. The system of claim 7, wherein each of the intended beamform, the realized beamform, and the optimized beamform comprises a service beam.

10. The system of claim 7, wherein the second set of signals comprises one or more signals having at least one of a different phase and amplitude than the first set of signals.

11. The system of claim 7, wherein the determination that the realized beamform is different than the intended beamform is based on feedback from the antenna array.

12. The system of claim 7, wherein the computer processing component is a node that is communicatively coupled to the antenna array.

13. The system of claim 12, wherein the node is configured to wirelessly communicate with a plurality of UEs according to a 5G protocol.

14. The system of claim 7, wherein the antenna array comprises 64 transmit antenna elements.

* * * * *